United States Patent
Subasic et al.

(10) Patent No.: US 9,794,072 B2
(45) Date of Patent: Oct. 17, 2017

(54) CERTIFICATE EXCHANGE MECHANISM FOR WIRELESS NETWORKING

(71) Applicant: Redline Communications Inc., Markham (CA)

(72) Inventors: Bojan Subasic, Mississauga (CA); Weixiong Lin, Markham (CA)

(73) Assignee: Redline Communications Inc., Markham, Ontario (CA)

( * ) Notice: Subject to any disclaimer, the term of this patent is extended or adjusted under 35 U.S.C. 154(b) by 41 days.

(21) Appl. No.: 14/933,055

(22) Filed: Nov. 5, 2015

(65) Prior Publication Data
US 2017/0134170 A1    May 11, 2017

(51) Int. Cl.
| H04L 29/06 | (2006.01) |
| H04L 9/32 | (2006.01) |
| H04W 12/04 | (2009.01) |
| H04L 9/30 | (2006.01) |
| H04L 9/08 | (2006.01) |

(52) U.S. Cl.
CPC .......... *H04L 9/3263* (2013.01); *H04L 9/085* (2013.01); *H04L 9/3066* (2013.01); *H04L 63/0823* (2013.01); *H04W 12/04* (2013.01); *H04L 2209/24* (2013.01); *H04L 2209/64* (2013.01); *H04L 2209/80* (2013.01)

(58) Field of Classification Search
None
See application file for complete search history.

(56) References Cited

U.S. PATENT DOCUMENTS

| 6,085,320 | A * | 7/2000 | Kaliski, Jr. | G06F 21/33 713/168 |
| 2007/0223706 | A1* | 9/2007 | Gantman | G06F 21/34 380/286 |
| 2009/0282262 | A1* | 11/2009 | Nonoyama | G06F 21/53 713/189 |
| 2011/0202755 | A1* | 8/2011 | Orsini | H04L 63/029 713/151 |
| 2011/0238987 | A1* | 9/2011 | Kherani | H04L 1/0041 713/168 |
| 2014/0019774 | A1* | 1/2014 | Nakayama | G06F 21/79 713/189 |
| 2014/0173270 | A1* | 6/2014 | Matsuo | H04L 9/0869 713/150 |

(Continued)

*Primary Examiner* — Malcolm Cribbs
(74) *Attorney, Agent, or Firm* — Rosenberg, Klein & Lee

(57) ABSTRACT

A wireless communications system comprises a sector controller that includes a wireless transmitter, and a mobile subscriber station that includes a wireless receiver, and a memory. The wireless transmitter continuously transmitting frames. Each frame comprising a control field and the control field comprising a portion of an encryption certificate associated with the sector controller. The wireless receiver receives each frame and extracts the portion of the encryption certificate and stores the portion of an encryption certificate in the memory. The mobile subscriber station combines the portions of the encryption certificate stored in the memory and verifies that a complete encryption certificate has been received. After this the mobile subscriber station transmits its encryption certificate to the sector controller. The encryption certificates are based on an elliptic curve digital signature algorithm.

16 Claims, 4 Drawing Sheets

(56) References Cited

U.S. PATENT DOCUMENTS

2014/0337234 A1* 11/2014 Tang .................... H04L 9/3265
                                                        705/71
2015/0317466 A1* 11/2015 Kumar .................. G06F 21/32
                                                        726/7
2016/0358137 A1* 12/2016 Ryu .................... G06Q 20/382

* cited by examiner

CERTIFICATE EXCHANGE MECHANISM FOR WIRELESS NETWORKING

FIELD OF THE INVENTION

The present disclosure generally relates to the field of wireless network security. Specifically, it relates to the use of elliptical cryptography for the exchange of security certificates.

BACKGROUND OF THE INVENTION

Wireless networking is a widely implemented and rapidly growing segment of the modern networking infrastructure. It allows for mobile devices to connect to a network without regard for wiring and other client side infrastructure. Wireless networking can be used in corporate, campus, urban, and rural settings. However, the lack of wiring carries the inherent risk that third parties can monitor the wireless signals and eavesdrop on communications. For both privacy and security reasons, secure wireless communications is a requirement for any feasible wireless communications system. In order to implement secure wireless communications, typically both authentication and encryption is used. Devices wishing to join a wireless network must register to gain access to the network. Presently there is a significant communication overhead that leads to an extended registration time in order to implement secure communications in wireless networks.

Existing security mechanism require a handshaking algorithm between an eNodeB or a controller (SC), and user equipment (UE) or a subscriber station (SS) in order to exchange properly signed certificates and to establish traditional public private key pairs in order to setup AES (Advanced Encryption Standard) symmetrical keys required for secure communications. These handshaking algorithms require a number of steps and due to the size of traditional certificates that have to be exchanged over the wireless network, in many cases this would require multiple wireless packets to be sent. This leads to significant overhead that greatly affects the time required for the initial network attachment process. This issue is most serious in situations when a massive registration event is ongoing where a large number of SS units are coming to the coverage area of the eNodeB or SC and have to perform initial network attachment.

Most public key certificates used today conform to the ITU-T (ITU Telecommunication Standardization Sector) X.509 standard certificates and are based on RSA cryptography. According to FIPS (Federal Information Processing Standards) guidelines, in order to implement a sufficient level of protection when an AES 128 bit key is used for data plane communication, the minimum size of RSA key required to sign certificates must be 1024 bytes. For a 256 bit AES the size of the RSA key must be at least 15 kb. Certificates also contain some additional information about the issuer, expiration date, etc. which further increase increase the certificate size.

In a typical implementation of a security handshaking algorithm, both sides have to exchange security certificates in order to initiate a link. In a 1+N point-to-multipoint networking this effectively leads to a scenario where this process must be repeated N times. For every UE or SS unit that performs an initial network attachment process, the eNodeB or SC has to send its own certificate to the UE or SS and the UE or SS unit has to send its certificate back to the eNodeB or SC.

Certificates generated and used by a eNoveB and SS are usually of the same size. In scenario with one eNodeB and 80 SS using 256 bit AES, 15 Kbyte certificates would be transmitted over the wireless network 160 times.

Certificates are usually exchanged using control channels that are not allocated a large amount of bandwidth capacity since they are normally used for short messages used for wireless links management. The use of control channels for the amount of data required to exchange large certificates over a wireless network results in significant packet fragmentation and a need to send large numbers of wireless packets over the air in order to fully exchange certificates.

Elliptic curve cryptography is another approach to public key cryptography that is based on finding the algebraic structure of elliptic curves over finite fields.

BRIEF SUMMARY

One embodiment of the invention includes a method of exchanging encryption certificates in a wireless network. A sector controller transmits a plurality of frames to a mobile subscriber station. Each frame comprising a control field which includes a portion of an encryption certificate associated with the sector controller. The portions of the encryption certificate contained in the plurality of frames comprise a complete encryption certificate.

In some embodiments of the invention the encryption certificate is based on an elliptic curve digital signature algorithm.

Another embodiment of the invention includes a method of exchanging encryption certificates in a wireless network where a mobile subscriber station receives a plurality of frames transmitted by a sector controller that includes a memory. Each frame comprising a control field including a portion of an encryption certificate associated with the sector controller. The mobile subscriber station extracts the portion of the encryption certificate included in the plurality of frames and stores the portions of the encryption certificate in the memory. The mobile subscriber station combines the portions of the encryption certificate stored in the memory and verifies that a complete encryption certificate has been received. After verifying that the complete encryption certificate has been received, the mobile subscriber station transmits a second encryption certificate to the sector controller. The second encryption certificate is associated with the mobile subscriber station.

In a further embodiment of the invention, a wireless communications system comprises a sector controller that includes a wireless transmitter and a mobile subscriber station that includes a wireless receiver and a memory. The wireless transmitter continuously transmitting frames that comprise a control field which includes a portion of an encryption certificate associated with the sector controller. The wireless receiver receives each frame and extracts the portion of the encryption certificate and stores the portion of the encryption certificate in the memory. The mobile subscriber station combines the portions of the encryption certificate stored in the memory and verifies that a complete encryption certificate has been received. After the mobile subscriber station has verified that the complete encryption certificate has been received, the mobile subscriber station transmits a second encryption certificate to the sector controller which is associated with the mobile subscriber station.

In some embodiments portions of the encryption certificate also include an index field.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
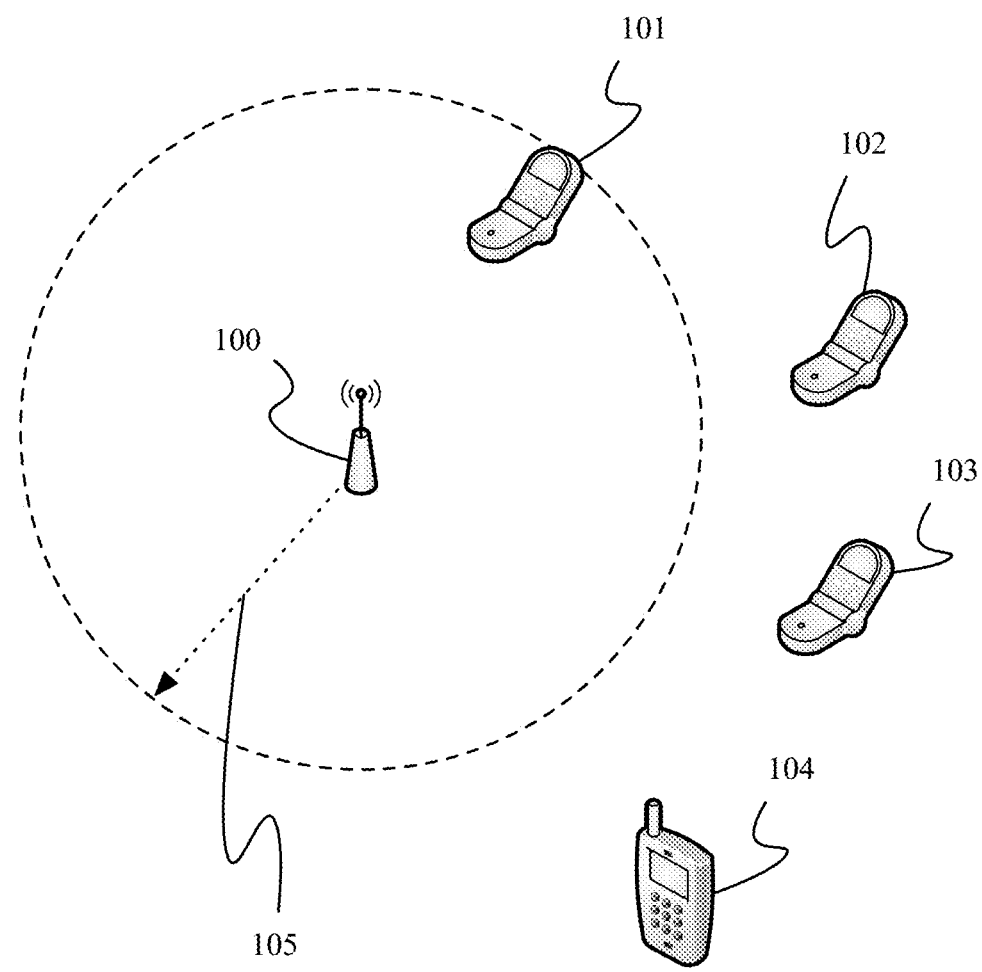
FIG. 1 is a drawing of a typical arrangement of a sector controller and a plurality of mobile subscriber stations.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

FIG. 1 shows a typical wireless network. In an embodiment of the invention Elliptic Curve Digital Signature Algorithms (ECDSA) are used instead of RSA to generate and sign encryption keys or certificates exchanged by an eNodeB or sector controller (SC) 100 and user equipment (UE) or a subscriber station (SS) 101-104. The use of ECDSA based signatures leads to a significant reduction in certificate size. This significantly reduces overhead of exchanging certificates and leads to a significant reduction in the fragmentation of messages required to exchange the certificates.

Figure 2:
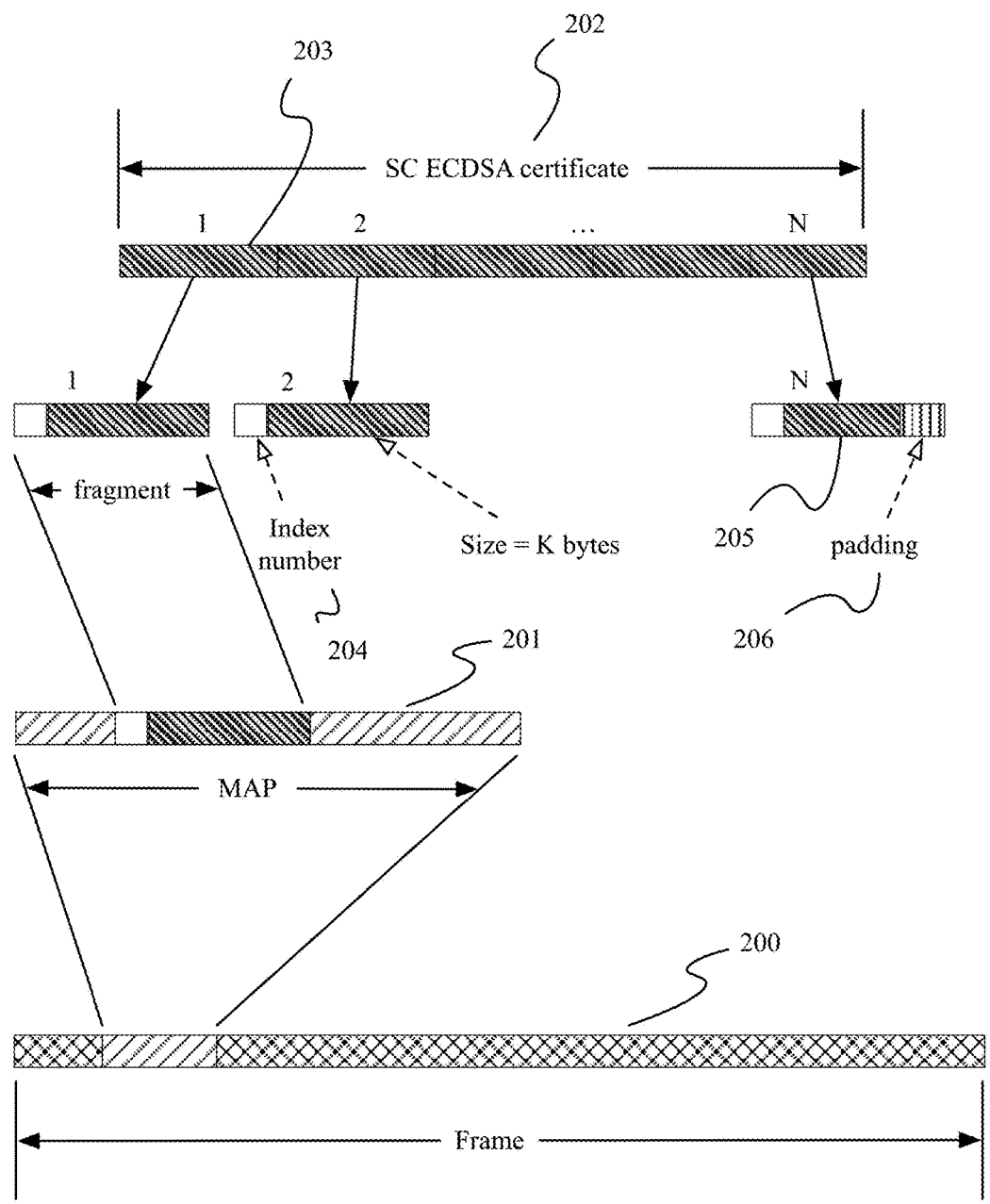
FIG. 2 is a drawing of a frame being transmitted by a sector controller indicating the MAP field and ECDSA certificate and fragments of the ECDSA certificate.

The wireless protocol according to one embodiment of the inventions makes improvements in reducing the overhead of exchanging encryption certificates by reducing the size of certificates from what has been used in the past. Referring to FIG. 2, the improved wireless protocol is a type of centralized and scheduled protocol operating on a frame 200 based principle where eNodeB or SC devices schedule and control traffic in both directions between the SC and the SS. In each frame, the SC sends a control field or MAP 201 (Media Access Protocol) information that provides resource allocation and control information to the SS. The MAP 201 describes the downlink and uplink traffic patterns and specifies when a specific SS link will receive or transmit a specified amount of data and which modulation should be used to carry traffic over the air. Since frames are continuously repeated and there is a MAP field 201 at the included in every frame 200 this is used to schedule communications between an SC and large number of SS.

ECDSA certificates 202 are used to exchange keys. The ECDSA keys are small in size and are segmented by the SC and inserted into the MAP field 201 of frames 200. For example, if the ECDSA certificate 202 consists of 200 bytes, it may be split into 10 fragments 203 of 20 bytes each. An index byte 204 is combined with each fragment 203 and then and added to the MAP field 201. If the size of the certificate 202 is not exactly divisible by N, then the last fragment 205 may be less than K bytes. In this case padding 206 may be added to the last fragment 205 in order to add up to K bytes. The increase in size of the MAP field amounts to a small increase in the size of the MAP that does not significantly affect network performance.

Figure 3:
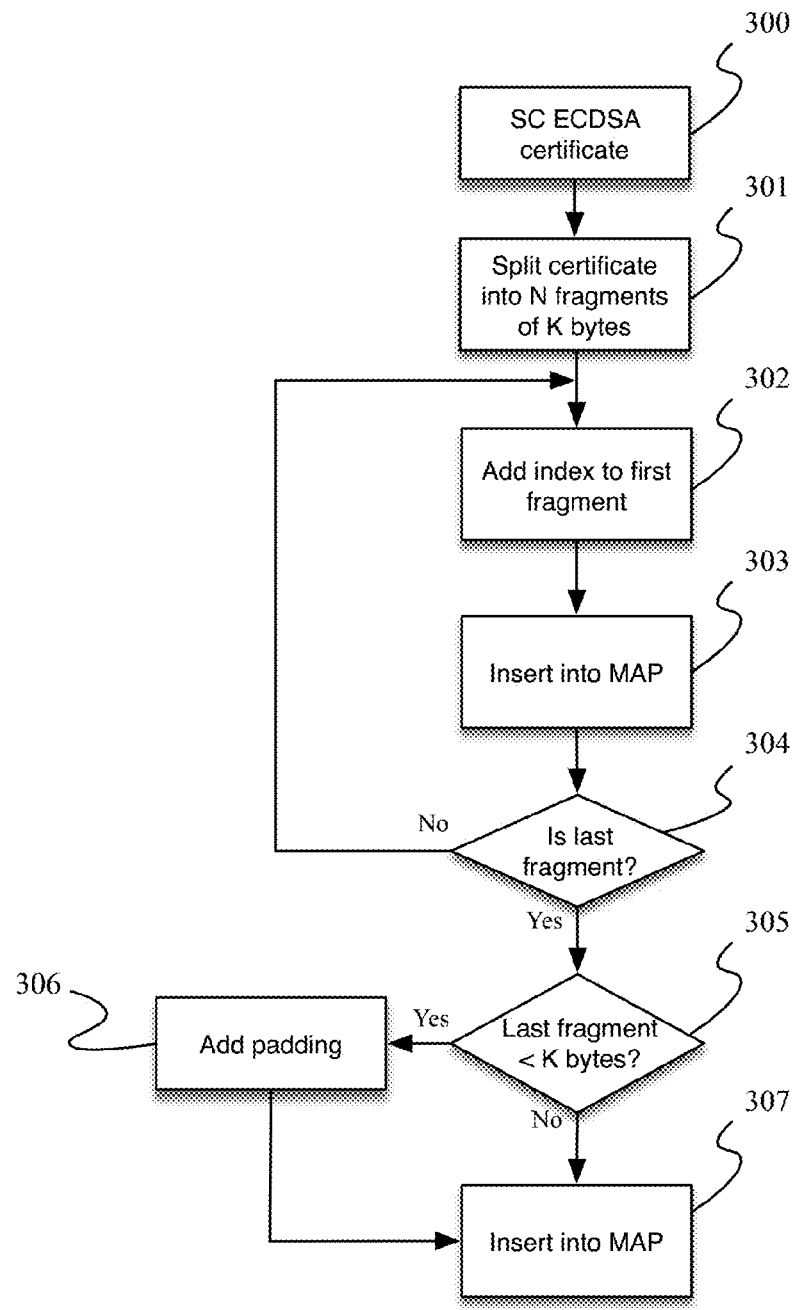
FIG. 3 is a flowchart of the sector controller initialization procedure where a certificate is inserted into frames.

Referring to FIG. 3, during initialization the SC splits its own ECDSA certificate 300 into multiple (N) smaller fragments of size K bytes 301. Each fragment consists of an index number 302 followed by K bytes of is inserted into MAP fields 303. If the size of the certificate is not exactly divisible by N, then the last segment 304 may be less than K bytes. In this case padding may be added to the last fragment in order to add up to K bytes 306. K may be chosen so that the additional data in each MAP frame does not adversely affect network performance. The MAP fields are transmitted in frames and be be consecutive frames but are not required to be so. The ECDSA certificate contains an indication of the certificate size, and is CRC protected. Upon receiving all the fragments, the SS will reassemble the fragments and process the CRC to detect, or detect and correct any errors. After verifying the ECDSA certificate is received successfully, the SS will process certificate verification to make sure the certificated is valid. After successful certificate validation, the SS will start the registration process by sending it's own ECDSA certificate.

Sector controller, SC, of a secure wireless network according to an embodiment of the invention is continuously transmitting frames. Each frame includes a MAP field and the SC's certificate is embedded in the MAP fields of multiple frames. The SC's certificate is simultaneously broadcast to all SS within range which eliminates the need for passing certificates from the SC to each individual SS in the network separately as part of the registration procedure. Subscriber stations SS1 to SS4 enter the area of coverage sense, detect the presence of the SC and begin a synchronization process. Each SS monitors over multiple frame periods in order to perform a variety of tasks such as RX gain adjustment, and frequency and time synchronization so they can synchronize with the SC and attempt to register with the network. In the process of monitoring the sequence of frames each SS is also captures and decodes MAP information embedded in each frame in order receive information indicating when they must send their registration request message. Since the SC's ECDSA certificate is also included with the MAP information each SS also receives the complete certificate as part of this synchronization process required to join the network.

In some embodiments of the invention the SS implementing the wireless protocol of the invention will have received the SC's complete ECDSA certificate prior to starting a registration attempt. The SS may also validate or partially validate the SC's validate SC certificate before sending any messages that could reveal its own presence in the field if the certificate was to be found invalid. This feature has several advantages in high security applications such as secure military communications.

To further enhance security, in other embodiments of the invention the SC will have multiple certificates and will choose which one to use based on prearranged criteria. One example would be to choose the SC's certificate based on time of day or the amount of time the particular certificate has been used. This has the effect of associating an expiry time with the transmitted certificate. This may be an encoded or clear text time stamp embedded or encoded in the certificate or transmitted out of band. Other enhancements could include preregistering SS and have the SC stop transmitting it's ECDSA certificate once all SS have joined the network. Another enhancement would be for the SS to transmit their ECDSA certificate only at certain times of day. Another option would be for certificate transmission to initiated by another system controller and the certificate being transmitted for a predetermined period of time or until a predefined number of SS or predetermined specific SS having joined the network.

The SC is continuously transmitting its ECDSA certificate embedded in MAP fields of frames. In cases where an SS experiences a network error that causes it to fail to receive part of the key it can continue to monitor frames until the missing piece of the key is retransmitted. The SC does not have to monitor or track transmission errors related to certificate transmission or implement error recover procedures to retransmit the key. This simplified state machines within the SC and allows the design of the SC to be simplified. Under the present protocol, the SS registration process does not start until a SS has received and validated the SC's certificate. The SC simply waits for an SS to initiate the registration process.

Figure 4:
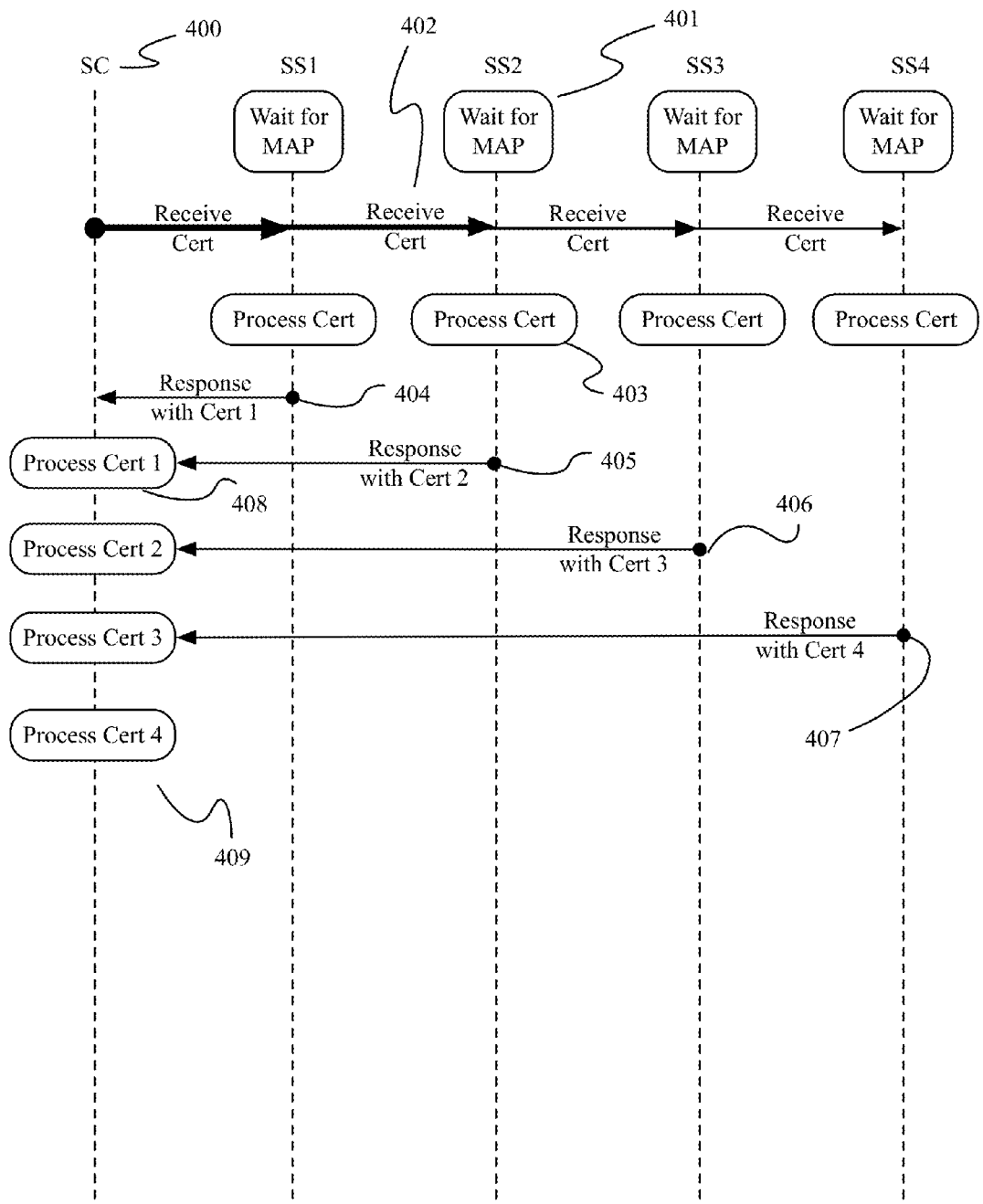
FIG. 4 is a flow diagram showing the process when four subscriber stations authenticate with a sector controller according to an embodiment of the invention.

FIG. 4 illustrates the registration process for a 1 SC+4 SS secure wireless network as implemented in one embodiment of the invention. The SC 400 is continuously broadcasting frames that include MAP fields. The MAP fields include fragments of the ECDSA certificate of the SC. Four SS 401, labeled as SS1 to SS4, come within range of the SC and must synchronize and authenticate with the SC before being able to join the network. Each SS 401 monitors the SCs transmissions, including the MAP fields, and extracts the ECDSA certificate 402 of the SC that is transmitted over several frames. If part of the certificate is lost during transmission or uncorrectable errors occur, the SS will continue to monitor frames until it successfully receives the SC's certificate without errors. The information in the MAP field also instructs each SS when it can initiate the registration process. When each SS has received and verified the SC's certificate 403 it will then transmit it's ECDSA certificate at the time communicated by the MAP field. SS1 sends its ECDSA certificate to the SC 404. The SC performs error detection, error correction, and verification on SS1's certificate 408. SS2 then transmits it's ECDSA certificate 405 which can happen at the same time as the SC is processing SS1's certificate. This if followed by transmission of SS3 406 and SS4's ECDSA certificates 407 while the SC processes the certificates from all four SSs 409.

The proposed method to exchange certificates is efficient and requires less involvement from the SC than other methods. This is very important as the processing capacity requirement of the sector controller is very high, especially for large 1+N networks. The proposed protocol simplifies the processing load and design of the sector controller. The example was demonstrated by using 1+4 network, and it is obvious that the advantage of the broadcast method is greater when the number of subscriber increases.

Although the protocol described above including those with reference to the foregoing figures have been described, it should be understood that these protocols can be implemented as in a mixture of hardware and software. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire protocol and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of exchanging encryption certificates in a wireless network, the method comprising:
   transmitting by a sector controller to a plurality of mobile subscriber stations, a plurality of frames, each frame comprising a control field, the control field comprising a portion of an encryption certificate associated with the sector controller, wherein the portions of an encryption certificate contained in the plurality of frames comprise a complete encryption certificate;
   a first of the plurality of mobile subscriber stations receiving the plurality of frames and responding by transmitting a first subscriber encryption certificate to the sector controller;
   a second of the plurality of mobile subscriber stations receiving the plurality of frames, the second of the plurality of mobile subscriber stations comprising a second memory, and the second of the plurality of mobile subscriber stations extracting from the plurality of frames the portion of the encryption certificate and storing the portion of the encryption certificate in the second memory, combining by the second of the plurality of mobile subscriber stations, the portions of an encryption certificate stored in the second memory, verifying that a complete encryption certificate has been received, and responding by transmitting a second subscriber encryption certificate to the sector controller;
   wherein the plurality of mobile subscriber stations are preregistered with the sector controller, the sector controller ceasing to transmit the portions of the encryption certificate associated with the sector controller once a subscriber encryption certificate has been received from all of the plurality of mobile subscriber stations.

2. The method of claim 1, wherein
   the encryption certificate is based on an elliptic curve digital signature algorithm.

3. A method of exchanging encryption certificates in a wireless network, the method comprising:
   receiving by a first mobile subscriber station, a plurality of frames transmitted by a sector controller, each frame comprising a control field, the control field comprising a portion of an encryption certificate associated with the sector controller, the first mobile subscriber station comprising a first memory, and the first mobile subscriber station extracting from each of the plurality of frames the portion of an encryption certificate and storing the portion of an encryption certificate in the first memory, combining by the mobile subscriber station, the portions of an encryption certificate stored in the first memory, and verifying that a complete encryption certificate has been received;

transmitting by the first mobile subscriber station a first subscriber encryption certificate to the sector controller;

receiving by a second mobile subscriber station, the plurality of frames, the second subscriber station comprising a second memory, and the second mobile subscriber station extracting from the plurality of frames the portion of the encryption certificate and storing the portion of the encryption certificate in the second memory, combining by the second mobile subscriber station, the portions of an encryption certificate stored in the second memory, and verifying that a complete encryption certificate has been received;

transmitting by the second mobile subscriber station a second subscriber encryption certificate to the sector controller;

wherein the first mobile subscriber station and the second mobile subscriber station are preregistered with the sector controller, the sector controller ceasing to transmit the portions of the encryption certificate associated with the sector controller once it has received the first subscriber encryption certificate and the second subscriber encryption certificate.

4. The method of claim 3, wherein
the encryption certificate is based on an elliptic curve digital signature algorithm.

5. The method of claim 3, further comprising
after verifying that the complete encryption certificate has been received, transmitting by the mobile subscriber station to the sector controller, a second encryption certificate, the second encryption certificate associated with the mobile subscriber station.

6. A wireless communications system comprising:
a sector controller, the sector controller including a wireless transmitter,
a plurality of mobile subscriber stations, each of the plurality of mobile subscriber stations including a wireless receiver, and a memory,
the wireless transmitter continuously transmitting frames, each frame comprising a control field, the control field comprising a portion of an encryption certificate associated with the sector controller,
each of the wireless receivers of the plurality of mobile subscriber stations receiving each frame and extracting the portion of an encryption certificate and storing the portion of an encryption certificate in the memory, and each of the plurality of mobile subscriber stations combining the portions of an encryption certificate stored in the memory and verifying that a complete encryption certificate has been received;
each of the plurality of mobile subscriber stations replying to the sector controller with a subscriber encryption certificate corresponding to each of the plurality of mobile subscriber stations;
wherein the plurality of mobile subscriber stations are preregistered with the sector controller, the sector controller ceasing to transmit the portions of the encryption certificate associated with the sector controller once it has received the subscriber encryption certificates corresponding to each of the plurality of mobile subscriber stations.

7. The wireless communications system of claim 6, wherein
after the mobile subscriber station has verified that the complete encryption certificate has been received, the mobile subscriber station transmits a second encryption certificate to the sector controller, the second encryption certificate associated with the mobile subscriber station.

8. The wireless communications system of claim 7, wherein
the encryption certificate and the second encryption certificate are based on an elliptic curve digital signature algorithm.

9. The wireless communications system of claim 6, wherein
the portion of an encryption certificate further comprises an index field.

10. The wireless communications system of claim 6, wherein
the encryption certificate is based on an elliptic curve digital signature algorithm.

11. The method of claim 1, wherein
the control fields of the plurality of frames further comprise a first time field and a second time field, the first of the plurality of mobile subscriber stations transmitting the first subscriber encryption certificate at a first time communicated by the first time field, the second of the plurality of mobile subscriber stations transmitting the second subscriber encryption certificate at a second time communicated by the second time field.

12. The method of claim 3, wherein
the control fields of the plurality of frames further comprise a first time field and a second time field, the first mobile subscriber station transmitting the first subscriber encryption certificate at a first time communicated by the first time field, the second mobile subscriber station transmitting the second subscriber encryption certificate at a second time communicated by the second time field.

13. The method of claim 6, wherein
the control fields of the plurality of frames further comprise a plurality of time fields, each of the plurality of time fields associated with one of the plurality of mobile subscriber stations, each of the plurality of mobile subscriber stations replying to the sector controller at a time indicated in their associated time field.

14. The method of claim 1, wherein
the sector controller continuously transmits the portions of the encryption certificate.

15. The method of claim 3, wherein
the sector controller continuously transmits the portions of the encryption certificate associated with the sector controller.

16. The method of claim 6, wherein
the sector controller continuously transmits the portions of the encryption certificate associated with the sector controller.

* * * * *